United States Patent
Lee et al.

(10) Patent No.: US 10,766,976 B2
(45) Date of Patent: Sep. 8, 2020

(54) METHOD OF PREPARING VINYL CHLORIDE-BASED POLYMER

(71) Applicant: LG CHEM, LTD., Seoul (KR)

(72) Inventors: Se Woong Lee, Daejeon (KR); Seong Yong Ahn, Daejeon (KR); Kun Ji Kim, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 173 days.

(21) Appl. No.: 16/079,437

(22) PCT Filed: Sep. 19, 2017

(86) PCT No.: PCT/KR2017/010247
§ 371 (c)(1),
(2) Date: Aug. 23, 2018

(87) PCT Pub. No.: WO2018/056668
PCT Pub. Date: Mar. 29, 2018

(65) Prior Publication Data
US 2019/0048110 A1    Feb. 14, 2019

(30) Foreign Application Priority Data
Sep. 23, 2016 (KR) .................. 10-2016-0122459

(51) Int. Cl.
| | | |
|---|---|---|
| C08F 14/06 | (2006.01) | |
| C08F 2/38 | (2006.01) | |
| C08K 5/37 | (2006.01) | |
| C08K 5/372 | (2006.01) | |
| C08K 5/00 | (2006.01) | |
| C08F 2/02 | (2006.01) | |

(52) U.S. Cl.
CPC .............. *C08F 14/06* (2013.01); *C08F 2/02* (2013.01); *C08F 2/38* (2013.01); *C08K 5/00* (2013.01); *C08K 5/37* (2013.01); *C08K 5/372* (2013.01); *C08F 2500/02* (2013.01); *C08F 2500/03* (2013.01)

(58) Field of Classification Search
USPC ....................................... 526/87, 224, 344.1
See application file for complete search history.

(56) References Cited

U.S. PATENT DOCUMENTS

| | | | |
|---|---|---|---|
| 3,637,623 A * | 1/1972 | Lo Monaco et al. ... | C08F 14/06 526/211 |
| 4,189,552 A | 2/1980 | Kuwata et al. | |
| 4,797,458 A | 1/1989 | Sharaby | |
| 4,918,151 A | 4/1990 | Sharaby | |
| 5,112,522 A | 5/1992 | Sharaby | |
| 5,194,498 A | 3/1993 | Stevenson et al. | |
| 5,502,123 A | 3/1996 | Hiyama et al. | |
| 5,847,062 A | 12/1998 | Sharaby | |
| 9,428,601 B2 | 8/2016 | Ahn et al. | |
| 2010/0267912 A1 | 10/2010 | Ahn et al. | |

FOREIGN PATENT DOCUMENTS

| | | |
|---|---|---|
| CN | 1102653 A | 5/1995 |
| CN | 101506249 B | 1/2011 |
| EP | 0177956 A2 | 4/1986 |
| EP | 0258832 A2 | 3/1988 |
| JP | H11166004 A | 6/1999 |
| JP | 2009227698 A | 10/2009 |
| JP | 4843228 B | 12/2011 |
| JP | 2015105376 A | 6/2015 |
| KR | 100227919 B | 11/1999 |
| KR | 10-2015-0138724 | 12/2015 |
| KR | 1020160061126 A | 5/2016 |

* cited by examiner

*Primary Examiner* — Fred M Teskin
(74) *Attorney, Agent, or Firm* — Dentons US LLP

(57) ABSTRACT

The present invention relates to a method of preparing a vinyl chloride-based polymer, which includes inducing the nucleation of particles by adding a mercaptan-based chain transfer agent to a monomer composition including a vinyl chloride-based monomer and a preliminary polymerization initiator (preliminary polymerization); and preparing a polymer by mixing a vinyl chloride-based monomer and the particle nuclei and adding a main polymerization initiator (main polymerization). In the preparation method, a vinyl chloride-based polymer having a uniform molecular weight distribution and a desired number average molecular weight may be provided by controlling a degree of polymerization of a vinyl chloride-based polymer prepared in such a way that dispersibility is ensured by adjusting the point of time to add the mercaptan-based chain transfer agent to the point of time to reach a specific conversion rate of the preliminary polymerization.

7 Claims, No Drawings

METHOD OF PREPARING VINYL CHLORIDE-BASED POLYMER

CROSS-REFERENCE TO RELATED APPLICATION

This application is a National Stage Application of International Application No. PCT/KR2017/010247, filed Sep. 19, 2017, and claims the benefit of Korean Patent Application No. 10-2016-0122459, filed on Sep. 23, 2016, contents of which are incorporated herein by reference in their entirety for all purposes as if fully set forth below.

TECHNICAL FIELD

The present invention relates to a method of preparing a vinyl chloride-based polymer and a vinyl chloride-based polymer prepared thereby.

BACKGROUND ART

A vinyl chloride-based polymer, which is a polymer containing 50 wt % or more of a repeat unit derived from a vinyl chloride monomer (VCM), is widely applied because a cost is low, hardness is easily adjusted, and it is applicable to most processing devices. Moreover, a vinyl chloride-based polymer may be used to prepare a molded product excellent in physical and chemical properties, for example, mechanical strength, weather resistance, chemical resistance, and the like, and thus has been widely used in various fields.

Meanwhile, in the preparation of a vinyl chloride-based polymer with a low degree of polymerization, polymerization is generally performed at higher temperature and higher pressure than in the preparation of a vinyl chloride-based polymer with a high degree of polymerization. However, it is difficult to safely prepare a vinyl chloride-based polymer with a low degree of polymerization because of a limitation in a design pressure of a polymerization reactor and the like.

Therefore, a degree of polymerization may be adjusted using a mercaptan-based chain transfer agent, but this method has a drawback in that it is difficult to achieve a desired degree of polymerization or a polymer having a wide molecular weight distribution is obtained because, when a vinyl chloride-based polymer is prepared through bulk polymerization, polymerization is performed without water according to characteristics of bulk polymerization, and thus the dispersibility of an added chain transfer agent is degraded.

Accordingly, in the preparation of a vinyl chloride-based polymer with a low degree of polymerization, technology for preparing a polymer having a low polydispersity index and a desired degree of polymerization due to a narrow molecular weight distribution even while a safe operating condition is maintained upon the preparation is required.

DISCLOSURE

Technical Problem

The present invention is designed to solve the problems of the prior art, and it is an aspect of the present invention to provide a method of preparing a vinyl chloride-based polymer having a relatively uniform molecular weight distribution and a desired degree of polymerization by adding a mercaptan-based chain transfer agent when a specific conversion rate is reached upon nucleation of particles in a polymerization process of a vinyl chloride-based polymer to improve dispersibility, the method ensuring a low unit cost of production and a stable operating condition.

Technical Solution

In order to accomplish the above objectives, according to an embodiment of the present invention, there is provided a method of preparing a vinyl chloride-based polymer, which includes inducing the nucleation of particles by adding a mercaptan-based chain transfer agent to a monomer composition including a vinyl chloride-based monomer and a preliminary polymerization initiator (preliminary polymerization); and preparing a polymer by mixing a vinyl chloride-based monomer and the particle nuclei and adding a main polymerization initiator (main polymerization).

Advantageous Effects

According to the present invention, there can be provided a vinyl chloride-based polymer having a low polydispersity index by achieving a uniform molecular weight distribution and simultaneously a low number average molecular weight by achieving a low degree of polymerization by adding a chain transfer agent when a specific conversion rate of preliminary polymerization which is a previous step of the main polymerization is reached, and a method of preparing the vinyl chloride-based polymer which can ensure a low unit cost of production by using bulk polymerization and safety in a process by effectively applying a chain transfer agent.

BEST MODE

Hereinafter, the present invention will be described in more detail with reference to embodiments thereof. However, the following embodiments are merely presented to exemplify the present invention, and the scope of the present invention is not limited to the following embodiments.

EXAMPLES

Example 1

135 kg of a vinyl chloride-based monomer was added to a preliminary polymerization reactor which has a volume of 0.2 m$^3$ and was degassed so as to be in a high vacuum, 80 g of di-2-ethylhexyl peroxydicarbonate as a reaction initiator was added thereto, and then a pressure was increased to 12 K/G while stirring was maintained to induce the nucleation of particles. In this case, when a conversion rate of preliminary polymerization reached 8%, 60 g of 2-mercaptoethanol was added, and the preliminary polymerization was terminated when a conversion rate of the preliminary polymerization reached 10%.

75 kg of a vinyl chloride-based monomer was added to a 0.5 m$^3$ main polymerization reactor, the particle nuclei formed in the preliminary polymerization reactor were transferred thereinto, and then 170 g of 1,1,3,3-tetramethylbutyl peroxy neodecanoate as a reaction initiator was added. While stirring was maintained, polymerization was performed at a pressure of 7.5 K/G for 180 minutes. After the polymerization was completed, a residual unreacted vinyl chloride-based monomer was recovered using vacuum for 30 minutes while stirring was maintained to finally obtain a vinyl chloride-based polymer.

Example 2

A vinyl chloride-based polymer was prepared in the same manner as in Example 1 except that 45 g of 2-mercaptoethanol was added to a preliminary polymerization reactor and main polymerization was performed at a pressure of 8.0 K/G.

Example 3

A vinyl chloride-based polymer was prepared in the same manner as in Example 1 except that 75 g of 2-mercaptoethanol was added to a preliminary polymerization reactor and main polymerization was performed at a pressure of 8.0 K/G.

Example 4

A vinyl chloride-based polymer was prepared in the same manner as in Example 1 except that 2-mercaptoethanol was added to a preliminary polymerization reactor when a conversion rate of preliminary polymerization reached 3%.

Example 5

A vinyl chloride-based polymer was prepared in the same manner as in Example 1 except that 3-mercapto-1,2-propanediol instead of 2-mercaptoethanol was added to a preliminary polymerization reactor.

Comparative Example 1

A vinyl chloride-based polymer was prepared in the same manner as in Example 1 except that 2-mercaptoethanol was not added to a preliminary polymerization reactor.

Comparative Example 2

A vinyl chloride-based polymer was prepared in the same manner as in Example 1 except that 2-mercaptoethanol was not added to a preliminary polymerization reactor and main polymerization was performed at a pressure of 8.0 K/G.

Comparative Example 3

A vinyl chloride-based polymer was prepared in the same manner as in Example 1 except that 2-mercaptoethanol was added to a preliminary polymerization reactor when a conversion rate of preliminary polymerization reached 2%.

Comparative Example 4

A vinyl chloride-based polymer was prepared in the same manner as in Example 1 except that 2-mercaptoethanol was added to a preliminary polymerization reactor when a conversion rate of preliminary polymerization reached 10%.

Comparative Example 5

A vinyl chloride-based polymer was prepared in the same manner as in Example 1 except that 2-mercaptoethanol was added immediately when main polymerization was initiated, not in preliminary polymerization.

Comparative Example 6

A vinyl chloride-based polymer was prepared in the same manner as in Example 1 except that 10 g of 2-mercaptoethanol was added to a preliminary polymerization reactor and main polymerization was performed at a pressure of 8.0 K/G.

Comparative Example 7

A vinyl chloride-based polymer was prepared in the same manner as in Example 1 except that 150 g of 2-mercaptoethanol was added to a preliminary polymerization reactor and main polymerization was performed at a pressure of 8.0 K/G.

EXPERIMENTAL EXAMPLE 0.02 g of each of the vinyl chloride-based resins prepared in Examples 1 to 5 and Comparative Examples 1 to 7 was completely dissolved in 20 mL of THF, and then filtered using a filter having a pore size of 0.45 µm or less. For the resulting solution, a weight average molecular weight (Mw) and a number average molecular weight (Mn) were measured using Gel Permeation Chromatography (GPC) commercially available from Waters, and then a ratio (Mw/Mn) was calculated to derive a polydispersity index (PDI).

TABLE 1

| | Weight average molecular weight Mw | Number average molecular weight Mn | Number average degree of polymerization | Polydispersity index PDI |
|---|---|---|---|---|
| Example 1 | 114,209 | 50,313 | 805 | 2.27 |
| Example 2 | 113,400 | 50,625 | 810 | 2.24 |
| Example 3 | 99,329 | 43,375 | 694 | 2.29 |
| Example 4 | 111,639 | 50,063 | 801 | 2.23 |
| Example 5 | 114,570 | 50,250 | 804 | 2.28 |
| Comparative Example 1 | 140,250 | 63,750 | 1020 | 2.20 |
| Comparative Example 2 | 131,909 | 59,688 | 955 | 2.21 |
| Comparative Example 3 | ND | ND | ND | ND |
| Comparative Example 4 | 130,334 | 55,938 | 895 | 2.33 |
| Comparative Example 5 | 133,818 | 57,188 | 915 | 2.34 |
| Comparative Example 6 | 131,218 | 59,375 | 950 | 2.21 |
| Comparative Example 7 | ND | ND | ND | ND |

*ND: Unmeasurable

As shown in Table 1, it can be confirmed that Examples 1 to 5, in which a mercaptan-based chain transfer agent was added when a conversion rate of preliminary polymerization reached 3 to 8%, had a polydispersity index of about 2.3 or less, indicating a uniform molecular weight distribution, and a vinyl chloride-based polymer having a uniform molecular weight distribution, a number average molecular weight of 55,000 or less, and a low degree of polymerization may be prepared through the preparation method according to the present invention.

On the other hand, it can be confirmed that Comparative Examples 1 and 2, in which the same conditions were applied but a mercaptan-based chain transfer agent was not added, had a relatively uniform molecular weight distribution, but exhibited a significantly large number average molecular weight compared to Examples 1 to 5. Also, it can be confirmed that, in the case of Comparative Example 3 in which a mercaptan-based chain transfer agent was added before a conversion rate of preliminary polymerization reached 3%, the reaction did not sufficiently progress so that measurement was not possible because polymerization among the preliminary polymerization and a radical reaction caused by a chain transfer agent, which are competitive reactions, is degraded. In addition, it can be confirmed that Comparative Examples 4 and 5, in which a mercaptan-based chain transfer agent was added when a conversion rate of preliminary polymerization exceeded 8% or a chain transfer agent was added in the main polymerization after the preliminary polymerization was completed, had a high polydispersity index of greater than 2.3, indicating that the desired uniformity of a molecular weight distribution could not be achieved by adding a chain transfer agent.

In addition, it can be seen that Comparative Example 6, in which a significantly small amount of a mercaptan-based chain transfer agent was added, had a significantly large number average molecular weight like Comparative Example 2, indicating that a desired effect of a chain transfer agent could not be obtained, and in the case of Comparative Example 7 in which a significantly large amount of a mercaptan-based chain transfer agent was added, polymerization did not normally progress due to dominance of the radical reaction like Comparative Example 3.

From these results, it can be seen that a vinyl chloride-based polymer having a low molecular weight due to a low degree of polymerization and a significantly uniform molecular weight distribution can be prepared by adding a mercaptan-based chain transfer agent when a specific conversion rate of preliminary polymerization is reached.

MODE FOR INVENTION

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

A method of preparing a vinyl chloride-based polymer according to the present invention includes inducing the nucleation of particles by adding a mercaptan-based chain transfer agent to a monomer composition including a vinyl chloride-based monomer and a preliminary polymerization initiator (preliminary polymerization); and preparing a polymer by mixing a vinyl chloride-based monomer and the particle nuclei and adding a main polymerization initiator (main polymerization).

Preliminary Polymerization

According to an embodiment of the present invention, polymerization may be performed in two steps in the preparation of a vinyl chloride-based polymer. A vinyl chloride-based polymer may be prepared by performing preliminary polymerization in which particle nuclei are formed and then performing main polymerization in which a polymer is prepared.

According to an embodiment of the present invention, the preliminary polymerization may be performed by adding a vinyl chloride-based monomer and a preliminary polymerization initiator to a prearranged preliminary polymerization reactor to form a monomer composition, performing preliminary polymerization for a predetermined time, and then adding a mercaptan-based chain transfer agent. The preliminary polymerization may be completed by terminating the reaction when a predetermined conversion rate is reached after a chain transfer agent is added so that particle nuclei are formed.

(Reaction Conditions)

Although the point of time to terminate the preliminary polymerization is not particularly limited, there may be a limitation that the reaction should not excessively progress because the preliminary polymerization is a reaction for inducing the nucleation of particles before a polymer is prepared, and in order to satisfy the limitation, the reaction is preferably terminated when a conversion rate reaches about 10% to 15%.

In addition, the preliminary polymerization is preferably performed under reaction conditions of a pressure of 11 to 13 K/G and a temperature of 65 to 75° C. During the preliminary polymerization, continuous stirring may be required, wherein the stirring is preferably performed at high speed as much as possible.

(Mercaptan-Based Chain Transfer Agent)

According to an embodiment of the present invention, the mercaptan-based chain transfer agent is added in preliminary polymerization so that the growth of a polymer may be suppressed. When the mercaptan-based chain transfer agent is added to a monomer composition, a reaction in which a radical is transferred through the chain transfer agent occurs. This radical reaction progresses together with the growth reaction of a polymer, and these two reactions may occur competitively.

Since two reactions competitively occur as described above, the growth reaction of a polymer may be partially suppressed, and thus a polymerization degree of a vinyl chloride-based polymer may be easily adjusted. As a result, a vinyl chloride-based polymer having a uniform molecular weight distribution and a low molecular weight may be prepared.

According to an embodiment of the present invention, in order for a mercaptan-based chain transfer agent to effectively act in polymerization, control of the point of time to add or addition amounts may be an important factor, and which substance is added may also be important.

The mercaptan-based chain transfer agent is not particularly limited as long as it is a compound including a mercapto group represented by "—SH", but it may preferably be a compound represented by Chemical Formula 1.

[Chemical Formula 1]

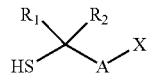

In Chemical Formula 1, $R_1$ and $R_2$ are the same or different from each other, are each independently hydrogen or a C1 to C20 alkyl group, and any one of $R_1$ and $R_2$ includes —OH, —COOH, or —COOR (here, R is a C1 to C5 alkyl group) when $R_1$ and $R_2$ are not hydrogen, A is a C1 to C30 alkylene group, a C1 to C30 alkylene group including one or more hydroxy groups, or a C2 to C30 heteroalkylene group, wherein the heteroalkylene group includes one or more heteroatoms selected from N, O, and S, and X is —OH, —COOH, or —COOR (here, R is a C1 to C5 alkyl group).

The mercaptan-based chain transfer agent essentially includes a mercapto group, and may further include one or more other functional groups. Also, a hydroxyl group represented by —OH, a carboxyl group represented by —COOH, or an ester group represented by —COOR is preferably applied thereto.

More particularly, the mercaptan-based chain transfer agent is a compound represented by Chemical Formula 1, and may be 2-mercaptoethanol, 3-mercapto-1,2-propanediol, methyl mercaptodecanoate, dimethyl 9-mercapto octadecyl-1,18-dioate, or a mixture thereof.

In addition to the type of the mercaptan-based chain transfer agent, the addition point and amount thereof may also be important. The mercaptan-based chain transfer agent may be added from a point in time when a conversion rate of preliminary polymerization reaches 3% to a point in time when it reaches 8%. When the mercaptan-based chain transfer agent is added at the above range of points in time, the dispersibility of the chain transfer agent is excellent, and thus an optimum effect of the mercaptan-based chain transfer agent may be obtained.

When the mercaptan-based chain transfer agent is added in advance although a conversion rate of preliminary polymerization has not reached 3%, there is a concern that polymerization does not normally progress because a radical transfer reaction caused by a chain transfer agent predominantly progresses before the growth of a polymer progresses so that the growth of a polymer among competitive reactions is degraded. When the chain transfer agent is added when a conversion rate has exceeded 8%, there is a concern that it is difficult to appropriately adjust a degree of polymerization because the growth of a polymer actively progresses, and thus a vinyl chloride-based polymer having a non-uniform molecular weight distribution or a large molecular weight is prepared.

In this case, when a conversion rate is 3 to 8%, the number of times of addition or an addition method may not significantly affect a prepared vinyl chloride-based polymer. Therefore, any method of separate addition, batch addition, and continuous addition may be applied. However, when the mercaptan-based chain transfer agent is batch-added when a conversion rate is 3 to 8%, an optimum effect may be exhibited.

The mercaptan-based chain transfer agent may be added in an amount of 0.01 to 0.1 parts by weight with respect to 100 parts by weight of the vinyl chloride-based monomer in the preliminary polymerization. When the mercaptan-based chain transfer agent is added in an amount of less than 0.01 parts by weight, the growth of a polymer may not be effectively suppressed, and when the mercaptan-based chain transfer agent is added in an amount of greater than 0.1 parts by weight, it may be difficult to progress the growth of a polymer due to the predominance of a radical transfer reaction caused by a chain transfer agent.

Such an action of the mercaptan-based chain transfer agent may not only occur in the preliminary polymerization but also continuously occur in the main polymerization because all products in the preliminary polymerization are transferred to a main polymerization reactor for further polymerization.

In addition, when the mercaptan-based chain transfer agent is used as described above, a high-temperature and high-pressure process essentially required in the preparation of a vinyl chloride-based polymer having a low degree of polymerization may be unnecessary due to such an action of the chain transfer agent, and thus a process may be more stably managed.

Main Polymerization

According to an embodiment of the present invention, the particle nuclei formed through the preliminary polymerization may be transferred to a prearranged main polymerization reactor, which may generally contain a vinyl chloride-based monomer. The particle nuclei and the vinyl chloride-based monomer are mixed, and a main polymerization initiator is added to the mixture to initiate main polymerization. The main polymerization may progress for a predetermined time and then be terminated to prepare a vinyl chloride-based polymer having a low degree of polymerization.

(Reaction Conditions)

According to an embodiment of the present invention, although the point of time to terminate the main polymerization is not particularly limited, the reaction is generally terminated after sufficient progression, unlike the preliminary polymerization, because the main polymerization is a reaction for forming a polymer. Therefore, the reaction is generally terminated when a conversion rate is about 70% or more.

In addition, the main polymerization is preferably performed under reaction conditions of a pressure of 7.0 to 8.0 K/G and a temperature of 50 to 60° C. During the main polymerization, continuous stirring may be required.

Common Items of Preliminary Polymerization and Main Polymerization (Reactor)

According to an embodiment of the present invention, the preliminary polymerization and the main polymerization may employ different reactors, and the employed reactors may be used in the preparation of a vinyl chloride-based polymer having a low degree of polymerization. Also, a volume ratio of a preliminary polymerization reactor and a main polymerization reactor may be about 25:75 to 40:60, and the main polymerization reactor may have a volume larger than that of the preliminary polymerization reactor.

(Vinyl Chloride-Based Monomer)

According to an embodiment of the present invention, the vinyl chloride-based monomer may be a pure vinyl chloride-based monomer or a mixture of a vinyl chloride-based monomer and a vinyl-based monomer copolymerizable with the vinyl chloride-based monomer. The vinyl-based monomer copolymerizable with the vinyl chloride-based monomer is not particularly limited, but may be an olefin compound such as ethylene, propylene, butene, or the like; a vinyl ester such as vinyl acetate, vinyl propionate, vinyl stearate, or the like; an unsaturated nitrile such as acrylonitrile or the like; a vinyl alkyl ether such as vinyl methyl ether, vinyl ethyl ether, vinyl octyl ether, vinyl lauryl ether, or the like; a halogenated vinylidene such as vinylidene chloride or the like; an unsaturated fatty acid such as acrylic acid, methacrylic acid, itaconic acid, maleic acid, fumaric acid, or the like, and an anhydride of these fatty acids such as maleic anhydride, itaconic anhydride; an unsaturated fatty acid ester such as methyl acrylate, ethyl acrylate, monomethyl maleate, dimethyl maleate, butyl benzyl maleate, or the like; or a crosslinkable monomer such as diallyl phthalate or the like. The vinyl-based monomer may be used alone or in combination of two or more thereof.

As described above, the vinyl chloride-based monomer may be added in both the preliminary polymerization and the main polymerization, and a larger amount thereof may be added in the preliminary polymerization than in the main polymerization because a vinyl chloride-based monomer added in a preliminary polymerization is generally transferred to a main polymerization reactor for continued progression of the polymerization reaction. In general, a weight ratio of amounts of a vinyl chloride-based monomer added in the preliminary polymerization and a vinyl chloride-based monomer added in the main polymerization may be about 55:45 to 75:25.

(Polymerization Initiator)

According to an embodiment of the present invention, a preliminary polymerization initiator and a main polymerization initiator may be used as a polymerization initiator, and may be the same or different from each other. The preliminary polymerization initiator and the main polymerization initiator each independently may be, for example, t-butyl peroxyester, cumyl peroxyester, cumyl peroxy neodecanoate, 1,1,3,3-tetramethylbutyl peroxy neodecanoate, t-hexyl peroxy neodecanoate, t-butyl peroxy neodecanoate, t-hexyl peroxypivalate, t-butyl peroxypivalate, di-sec-butyl peroxydicarbonate, di-2-ethoxyethyl peroxy dicarbonate, di-2-ethylhexyl peroxydicarbonate, isobutyryl peroxide, 3,5,5-trimethylhexanoyl peroxide, lauryl peroxide, or a mixture thereof.

The preliminary polymerization initiator may be added, but is not limited to, in an amount of 0.01 to 1 part by weight with respect to 100 parts by weight of the vinyl chloride-based monomer added in the preliminary polymerization, and may constitute a monomer composition together with the vinyl chloride-based monomer. The preliminary polymerization initiator may be added to a reactor when a vinyl chloride-based monomer is added or after a vinyl chloride-based monomer is added.

The main polymerization initiator may be added, but is not limited to, in an amount of 0.1 to 2 parts by weight with respect to 100 parts by weight of the vinyl chloride-based monomer further added in the main polymerization. The point of time to add the main polymerization initiator may slightly affect the reaction, and the main polymerization initiator may be added any time before the reaction is initiated, for example, when particle nuclei are transferred from a preliminary polymerization reactor, after the transfer is completed, when a vinyl chloride-based monomer is further added, or when the transfer of particle nuclei and the addition of a vinyl chloride-based monomer are completed.

(Bulk Polymerization)

According to an embodiment of the present invention, the preliminary polymerization and the main polymerization may be performed through a bulk polymerization method. In general, the bulk polymerization is performed without water, and thus a chain transfer agent is not smoothly dispersed due to the absence of water when a chain transfer agent is added. Accordingly, it is difficult to apply a chain transfer agent that may be added to progress a stable reaction without a high-temperature and high-pressure reaction when a vinyl chloride-based polymer having a low degree of polymerization is prepared.

However, according to an embodiment of the present invention, the above problems may be solved by appropriately adjusting the point of time to add a mercaptan-based chain transfer agent, and an effect of addition of a chain transfer agent may be maximized.

Since description of the addition of a chain transfer agent has already been described, a detail description thereof will not be repeated.

In the preparation method through bulk polymerization, a polymerization inhibitor may be added at the end of the main polymerization to eliminate the reactivity of a residual main polymerization initiator. The polymerization inhibitor is not particularly limited as long as it is commonly known in the art, but may be hydroquinone, butylated hydroxytoluene, hydroquinone monomethyl ether, quaternary butyl catechol, diphenyl amine, triisopropanolamine, triethanolamine, or the like. The polymerization inhibitor may be used by appropriately adjusting an amount thereof in accordance with an amount of a residual main polymerization initiator, and may be commonly used in an amount of 0.001 parts by weight to 0.1 parts by weight with respect to 100 parts by weight of the vinyl chloride-based monomer.

In addition, in the preparation method through bulk polymerization according to the present invention, a vinyl chloride-based monomer may be used in combination with a reaction medium, and an additive such as a molecular weight controlling agent may be further included in addition to the above-described effective component.

The reaction medium may be a common organic solvent without particular limitation. For example, the reaction medium may be an aromatic compound such as benzene, toluene, xylene, or the like, methyl ethyl ketone, acetone, n-hexane, chloroform, cyclohexane, or the like. The molecular weight controlling agent is not particularly limited, but may be, for example, n-butyl mercaptan, n-octyl mercaptan, n-dodecyl mercaptan, t-dodecyl mercaptan, or the like.

Vinyl Chloride-Based Polymer

According to an embodiment of the present invention, a vinyl chloride-based polymer prepared according to the above preparation method may have a low number average molecular weight due to a low degree of polymerization and a low polydispersity index due to a uniform molecular weight distribution.

According to an embodiment of the present invention, the vinyl chloride-based polymer may be generally used for applications such as a hard sheet, a fitting, and the like, and when the vinyl chloride-based polymer has a number average molecular weight of greater than 55,000 when being used for such an application, processability may be degraded.

Meanwhile, in order to apply a vinyl chloride-based polymer to applications such as a hard sheet, a fitting, or the like, a vinyl chloride-based polymer having a number average molecular weight of 55,000 or less may be prepared through bulk polymerization having a low unit cost of production. However, in order to lower a number average molecular weight to 55,000 or less through bulk polymerization, reaction conditions with a high risk such as high temperature and high pressure are generally required, and thus there is risk involved in the process.

In addition, a method in which a vinyl chloride-based polymer having a low number average molecular weight is prepared by adding a chain transfer agent may be employed. However, it is difficult to obtain a polymer having a desired number average molecular weight because a chain transfer agent is not easily dispersed due to the absence of a medium such as water in the case of bulk polymerization, or a vinyl chloride-based polymer having a wide molecular weight distribution is prepared due to a high polydispersity index.

However, according to the preparation method of the present invention, as described above, a chain transfer agent may be effectively used to ensure safety in the process and economic feasibility of a product and to prepare a vinyl chloride-based polymer suitable for application to a hard sheet, a fitting, or the like.

According to an embodiment of the present invention, the vinyl chloride-based polymer may be prepared through the above-described preparation method so as to have a) a number average molecular weight of 55,000 or less, b) a degree of polymerization of 890 or less, and c) a polydispersity index of 2.3 or less.

The vinyl chloride-based polymer preferably has a number average molecular weight of 37,000 to 55,000.

The vinyl chloride-based polymer preferably has a number average degree of polymerization of 600 to 890.

In addition, the vinyl chloride-based polymer may include the mercaptan-based chain transfer agent in an amount of 500 ppm or less. Some of the mercaptan-based chain transfer agent may remain even after the reaction, and the residual mercaptan-based chain transfer agent may not affect a vinyl chloride-based polymer even when being not removed.

The invention claimed is:

1. A method of preparing a vinyl chloride-based polymer comprising:

forming particle nuclei by adding a mercaptan-based chain transfer agent to a monomer composition including a vinyl chloride-based monomer and a preliminary polymerization initiator (preliminary polymerization); and preparing a polymer by mixing a vinyl chloride-based monomer and the particle nuclei and adding a main polymerization initiator (main polymerization).

2. The method of claim 1, wherein the mercaptan-based chain transfer agent is represented by Chemical Formula 1 below:

[Chemical Formula 1]

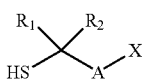

wherein $R_1$ and $R_2$ are the same or different from each other, are each independently hydrogen or a C1 to C20 alkyl group, and any one of $R_1$ and $R_2$ is combined with —OH, —COOH, or —COOR (here, R is a C1 to C5 alkyl group) when $R_1$ and $R_2$ are not hydrogen, A is a C1 to C30 alkylene group, a C1 to C30 alkylene group combined with one or more hydroxy groups, or a C2 to C30 heteroalkylene group, wherein the heteroalkylene group includes one or more heteroatoms selected from N, O, and S, and X is —OH, —COOH, or —COOR (here, R is a C1 to C5 alkyl group).

3. The method of claim 2, wherein the mercaptan-based chain transfer agent includes one or more selected from the group consisting of 2-mercaptoethanol, 3-mercapto-1,2-propanediol, methyl mercaptodecanoate, and dimethyl 9-mercaptooctadecyl-1,18-dioate.

4. The method of claim 1, wherein the mercaptan-based chain transfer agent is added when a conversion rate of the preliminary polymerization is 3 to 8%.

5. The method of claim 1, wherein the mercaptan-based chain transfer agent is added in an amount of 0.01 to 0.1 parts by weight with respect to 100 parts by weight of the vinyl chloride-based monomer in the preliminary polymerization.

6. The method of claim 1, wherein the main polymerization is performed through a bulk polymerization method.

7. The method of claim 1, wherein a volume ratio of a reactor for the preliminary polymerization and a reactor for the main polymerization is 25:75 to 40:60.

* * * * *